United States Patent
Lewis

(10) Patent No.: US 7,689,223 B1
(45) Date of Patent: Mar. 30, 2010

(54) METHOD AND SYSTEM FOR DELAYING RETRANSMISSION OF DATA TRAFFIC TO A WIRELESS TERMINAL

(75) Inventor: Ronald E. Lewis, Independence, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1281 days.

(21) Appl. No.: 10/454,858

(22) Filed: Jun. 5, 2003

(51) Int. Cl.
*H04W 40/00* (2009.01)

(52) U.S. Cl. .................. 455/445; 455/412.2; 455/466; 370/236; 370/231; 370/235; 370/355; 370/230

(58) Field of Classification Search ................. 455/445, 455/412.2, 466; 370/236, 231, 235, 351, 370/355, 230
See application file for complete search history.

(56) References Cited

U.S. PATENT DOCUMENTS

| | | | |
|---|---|---|---|
| 6,148,010 A | 11/2000 | Sutton et al. | |
| 6,240,287 B1 | 5/2001 | Cheng et al. | |
| 6,438,374 B1 | 8/2002 | Bhat | |
| 6,765,869 B2 * | 7/2004 | Chintada et al. | 370/230 |
| 6,829,473 B2 | 12/2004 | Raman et al. | |
| 6,879,561 B1 * | 4/2005 | Zhang et al. | 370/235 |
| 6,889,050 B1 | 5/2005 | Willars et al. | |
| 6,922,557 B2 * | 7/2005 | Fantaske | 455/403 |
| 6,975,876 B1 | 12/2005 | Cast et al. | |
| 7,184,401 B2 * | 2/2007 | Foore et al. | 370/231 |
| 2003/0003921 A1 | 1/2003 | Laakso | |
| 2003/0003932 A1 | 1/2003 | Corrigan et al. | |
| 2004/0006638 A1 | 1/2004 | Oberlander et al. | |
| 2004/0037224 A1 * | 2/2004 | Choi et al. | 370/235 |
| 2004/0095914 A1 | 5/2004 | Katsube et al. | |
| 2004/0198234 A1 | 10/2004 | Wacker et al. | |
| 2005/0041612 A1 | 2/2005 | Zhang et al. | |
| 2005/0216583 A1 | 9/2005 | Cole et al. | |
| 2005/0277430 A1 | 12/2005 | Meisl et al. | |

OTHER PUBLICATIONS

Simplewire™ Wireless Message Protocol Server Product Sheet, http://www.simplewire.com/downloads/files/sw-doc-ps-wmp-server.pdf, printed from the World Wide Web on Jan. 23, 2003.
U.S. Appl. No. 10/349,592, filed Jan. 23, 2003.

(Continued)

*Primary Examiner*—Yuwen Pan

(57) ABSTRACT

A method and system for delaying retransmission of data to a wireless terminal in response to a determination that a communication path to the wireless terminal does not currently exist. For instance, when a server, e.g., a proxy server or an application server, sends data to a cellular base station for transmission to a wireless terminal, the base station could determine that a radio link to the wireless terminal is not currently available. In order to prevent the server from continuously retransmitting the data to the base station due to the absence of an acknowledgement from the wireless terminal, the base station can notify the server to delay retransmission. A benefit of this arrangement is that the base station will not have to receive and buffer many copies of the same data while the base station waits for a communication path to the wireless terminal to become available.

15 Claims, 5 Drawing Sheets

OTHER PUBLICATIONS

U.S. Appl. No. 10/959,793, filed Oct. 6, 2004.
Office Action from U.S. Appl. No. 10/349,592, dated Mar. 13, 2006.
Office Action from U.S. Appl. No. 10/349,592, dated Jun. 5, 2006.
Office Action from U.S. Appl. No. 10/349,592, dated Jul. 28, 2006.
Office Action from U.S. Appl. No. 10/349,592, dated Nov. 6, 2006.
Office Action from U.S. Appl. No. 10/349,592, dated Feb. 7, 2007.
Office Action from U.S. Appl. No. 10/349,592, dated Sep. 12, 2007.
Office Action from U.S. Appl. No. 10/959,793, dated Oct. 2, 2006.
Office Action from U.S. Appl. No. 10/959,793, dated Apr. 9, 2007.

* cited by examiner

METHOD AND SYSTEM FOR DELAYING RETRANSMISSION OF DATA TRAFFIC TO A WIRELESS TERMINAL

BACKGROUND

1. Field of Invention

This invention relates to wireless communications and more particularly to a method and system for delaying retransmission of data traffic to a wireless terminal.

2. Description of Related Art

A wireless terminal is a form of telecommunications technology that enables people to communicate with others. The wireless terminal can take a variety of forms. The wireless terminal may be, for example, a cellular phone, a pager, a personal digital assistant (PDA), a portable computer with wireless modem, or a fixed wireless terminal.

An air interface separates the wireless terminal from a radio access network. The radio access network facilitates communication over the air interface, as between the wireless terminal and a remote terminal. The communication between the wireless terminal and the remote terminal may take the form of data traffic or voice traffic. The data traffic may represent data, such as session initiation protocol (SIP) messages, SIMPLE (SIP for Instant Messaging and Presence Leveraging Extensions) messages, wireless access protocol (WAP) messages, or some other type of messages. The voice traffic, on the other hand, may represent voice communications as produced, for instance, by a voice coder (vocoder).

The radio access network typically has a base station. In at least code division multiple access (CDMA) protocol, the base station assigns to a wireless terminal an air interface traffic channel to convey voice traffic or data traffic. The traffic channel defines a radio link layer connection to convey the voice traffic or the data traffic from the base station to the wireless terminal. Under many existing procedures, if a base station already assigned to a wireless terminal a traffic channel to convey voice traffic, then the base station cannot assign to the wireless terminal a traffic channel to convey data traffic. In CDMA, all traffic channels assigned to convey voice traffic to the wireless terminal would have to be released before the base station could assign a traffic channel to convey data traffic.

A proxy server may be communicatively coupled to the radio access network. The proxy server may enable the wireless terminal and the remote terminal to engage in instant messaging, short mail, or push-to-talk (PTT) communication sessions between the wireless terminal and the remote terminal.

In common with these types of communication sessions and others is that the proxy server has to send to the wireless terminal, data traffic. The proxy server typically sends the data traffic to the base station over the air interface. If the base station assigned to the wireless terminal a traffic channel to convey data traffic, then a radio link layer connection to the wireless terminal is available to convey the data traffic. The base station will send the data traffic to the wireless terminal. In turn, the wireless terminal will receive the data traffic and send an acknowledgement back to the proxy server. The acknowledgment indicates to the proxy server that the wireless terminal received the data traffic.

If, on the other hand, the base station assigned to the wireless terminal a traffic channel to convey voice traffic, then a radio link layer connection to the wireless terminal is unavailable to convey data traffic. The base station will buffer the data traffic. The base station will, for instance, buffer the data traffic in a packet control function (PCF) resident on the base station. When the base station releases all traffic channels assigned to the wireless terminal to convey voice traffic, then the base station may assign a traffic channel to the wireless terminal to convey data traffic. By assigning a traffic channel to convey the data traffic, the base station will be able to send to the wireless terminal the data traffic buffered in the PCF.

SUMMARY

When a radio link layer connection to the wireless terminal is unavailable to convey data traffic, the base station might not be able to send to the wireless terminal, data traffic received from a proxy server. Also, the wireless terminal might not be able to send an acknowledgement back to the proxy server that the data traffic was received. As a result, the proxy server may retransmit the data traffic to the wireless terminal. The proxy server may retransmit the data traffic, until the radio link layer connection to the wireless terminal is available to convey the data traffic, the base station sends the data traffic to the wireless terminal, and the proxy server receives an acknowledgement from the wireless terminal that the data traffic was received.

In accordance with an exemplary embodiment of the present invention, a proxy server may transmit data traffic to a wireless terminal. The base station may determine, during transmission of the data traffic from a proxy server to the base station, that a radio link layer connection to a wireless terminal is unavailable to convey data traffic. The base station may responsively notify the proxy server. The notification may, for instance, cause the proxy server to delay retransmission of data traffic to the wireless terminal for a predetermined period of time. By the proxy server delaying retransmission of data traffic, the base station might not have to buffer as much data traffic received from the proxy server while a radio link layer connection to the wireless terminal is unavailable to convey data traffic.

The base station may determine in a variety of ways availability of a radio link layer connection to convey data traffic to the wireless terminal. For instance, the base station may try to assign to the wireless terminal a traffic channel to convey data traffic. If no traffic channels have been assigned to convey voice traffic, then the base station may be able to assign to the wireless terminal a traffic channel to convey data traffic. A radio link layer connection to the wireless terminal may be available to convey data traffic. On the other hand, if a traffic channel has already been assigned to the wireless terminal to convey voice traffic, then the base station might not be able to assign to the wireless terminal a traffic channel to convey data traffic. A radio link layer connection to the wireless terminal may be unavailable to convey data traffic.

Alternatively, the base station may access a "service option" code associated with the wireless terminal. The "service option" code may indicate a type of communication with the wireless terminal. If the type of communication with the wireless terminal is voice traffic, then the base station might not have assigned to the wireless terminal any traffic channels to convey data traffic. A radio link layer connection to the wireless terminal may be unavailable to convey data traffic. Alternatively, if the type of communication with the wireless terminal is data traffic, then the base station might have assigned to the wireless terminal a traffic channel to convey data traffic. A radio link layer connection to the wireless terminal may be available to convey data traffic.

Still alternatively, the base station may monitor the data traffic buffered in the base station. The PCF buffer may have already buffered data traffic addressed to the wireless terminal. Presence of such data traffic already in the PCF buffer may indicate to the base station that a traffic channel to convey data traffic has not been assigned to the wireless terminal. Moreover, the presence of such data traffic may indicate that a radio link layer connection to the wireless terminal may be unavailable to convey data traffic. Otherwise, the base station would have sent the data traffic in the PCF buffer to the wireless terminal.

The base station may responsively notify the proxy server that the radio link layer connection to the wireless terminal is unavailable to convey data traffic. The notification may take a variety of forms. For instance, the notification may take the form of a "trying response" message. The "trying response" message may indicate to the proxy server that a radio link layer connection to the wireless terminal is unavailable to convey data traffic. Additionally, the "trying response" message may cause the proxy server to delay retransmitting data traffic for the predetermined period of time. The notification may take other forms, in addition to the "trying response" message described here.

These as well as other aspects and advantages will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
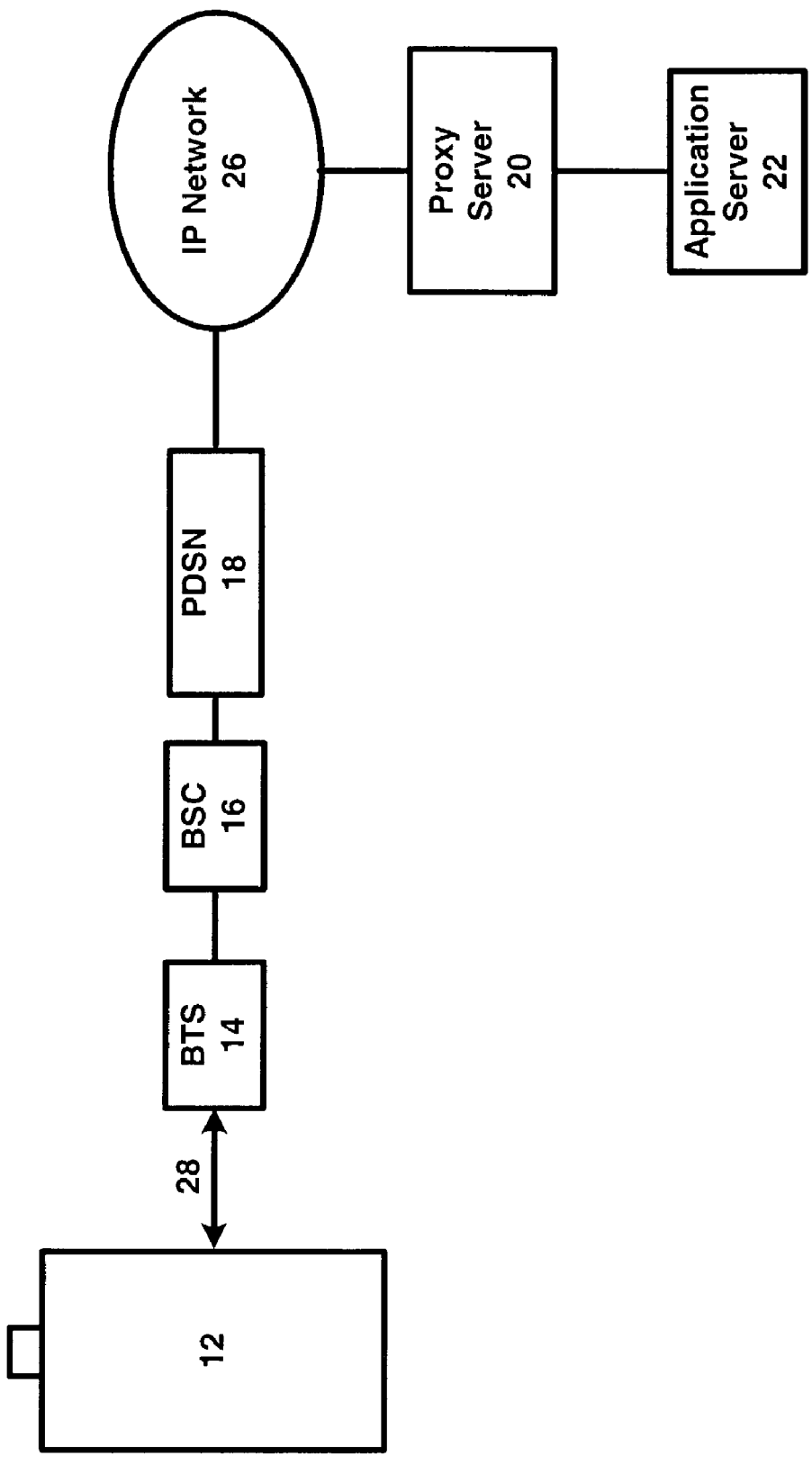
FIG. 1 is a block diagram illustrating a wireless network in which the exemplary embodiments of the present invention may be employed.

FIG. 1 illustrates a wireless network in which exemplary embodiments of the present invention may be employed. It should be understood that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location. Still further, the various functions described herein may be carried out by logic defined by hardware or by computer instructions, e.g., software or firmware, stored in memory and executable by a processor. Provided with the present disclosure, those skilled in the art can readily design the hardware or prepare the computer instructions necessary to perform the various functions.

The wireless network architecture may include a wireless terminal 12. The wireless terminal 12 may be a cellular phone, a pager, a personal digital assistant (PDA), a portable computer with wireless modem, or a fixed wireless device. Indeed, the wireless terminal 12 could take a variety of forms now known or later developed.

Additionally, the wireless network may include a radio access network. The radio access network may facilitate transmission and reception of signals with the wireless terminal 12, over an air interface 28. By way of example, the radio access network may include a base transceiver station (BTS) 14 that can communicate with the wireless terminal 12 over the air interface 28. The BTS 14 may be coupled with a base station controller (BSC) 16. The BTS 14 and BSC 16 combination may be collectively referred to as a "base station" or serving node to the wireless terminal 12. The base station may produce a radiation pattern that defines a coverage area of the radio access network.

The base station may, in turn, be coupled with a packet data serving node (PDSN) 18 or some other gateway into an IP network 26. The PDSN 18 may route packets between the radio access network and the IP network 26. As shown in FIG. 1, entities may be coupled to the IP network 26. These entities may include a proxy server 20 and an application server 22 coupled to the proxy server 20. The application server 22 and the proxy server 20 may be considered servers or serving nodes to the base station. The proxy server 20 may transmit and receive messages to and from, respectively, the base station. The proxy server 20 may be a SIP (session initiation protocol) proxy server that functions to transmit and receive SIP signaling messages, as defined by the application server 22. Additionally or alternatively, the proxy server 20 may be a WAP (wireless access protocol) proxy server that transmits and receives WAP messages, as defined by the application server 22. The application server 22 may define the messages that facilitate different types of communication sessions with the wireless terminal 12, such as instant messaging sessions or PTT sessions.

As shown by FIG. 1, the proxy server 20 and the application server 22 may be discrete entities. Alternatively, the proxy server 20 and the application server 22 may be integrated into a single platform. Still alternatively, the wireless network architecture might not include a proxy server 20. Instead, the application server 22 may be coupled directly to the IP network 26, without any intermediary device. Other arrangements are also possible.

As a general matter, the wireless terminal 12 may request a radio link layer connection to exchange voice traffic with the base station. The base station may responsively assign to the wireless terminal 12, a traffic channel to convey the voice traffic. The traffic channel may define a radio link layer connection to the wireless terminal 12.

Alternatively, the wireless terminal 12 may request a radio link layer connection to exchange data traffic, e.g., SIP messages, WAP messages, or some other type of messages, with the base station. The base station may responsively assign to the wireless terminal 12, a traffic channel to convey the data traffic. The traffic channel may define a radio link layer connection to the wireless terminal 12. Additionally, the wireless terminal 12 may negotiate with the PDSN 18 to set up a point-to-point protocol (PPP) session with the PDSN 18 and to obtain an IP address, so that wireless terminal 12 can engage in IP communications with the proxy server 20 over the IP network 26.

Figure 2:
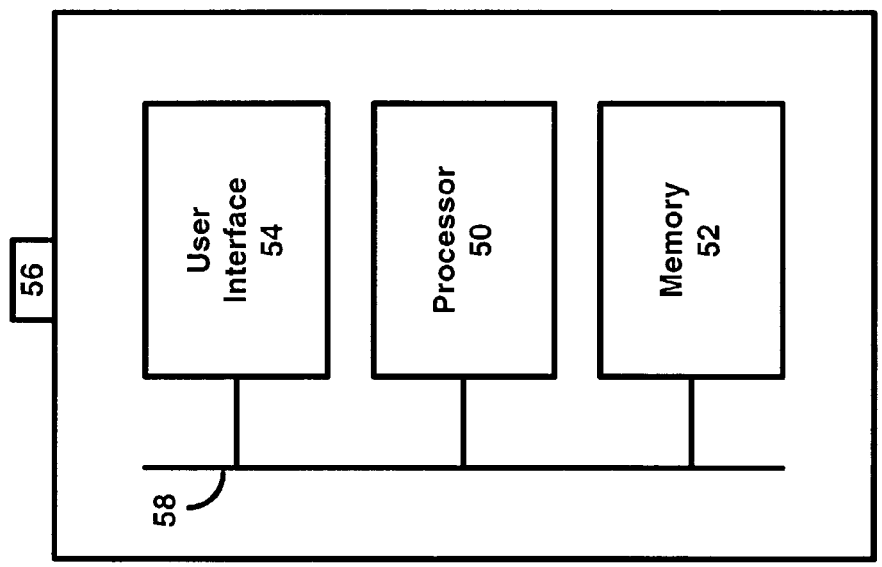
FIG. 2 is a block diagram depicting an exemplary wireless terminal.

FIG. 2 is a block diagram depicting the exemplary wireless terminal 12. The exemplary wireless terminal 12 may include a processor 50, memory 52, user interface 54, and wireless communication interface 56, coupled to a bus 58. Of course, other arrangements are also possible.

Each component of the wireless terminal 12 may take various forms, the particular details of which are not necessarily critical to the exemplary embodiments of the present invention. For instance, the processor 50 may be a general purpose processor or a digital signal processor. In addition, the memory 52 may be random access memory (RAM), read only memory (ROM), flash memory and/or a storage drive. The memory 52 may hold a set of logic (e.g., computer instructions) executable by processor 50 to request that a radio link layer connection to the wireless terminal 12 be established automatically when the wireless terminal 12 is powered on, in response to a user request, or in response to another triggering event. Alternatively, the logic may be embodied in firmware or hardware, rather than, or in addition to, being defined by the computer instructions.

User interface 54 may facilitate voice and data interactions with a user. The user interface 54 might include a microphone for receiving analog speech signals from a user and a speaker for playing out analog speech signals. Further, the wireless terminal 12 will likely include digital/analog conversion circuitry for converting between analog speech signals and digital representations of the analog speech signals. The user interface 54 may also include a display for presenting information and menus to a user, e.g., web content, as well as one or more input mechanisms (e.g., keyboard, keypad, mouse, and/or touch-sensitive display) for receiving input from the user.

Wireless communication interface 56 may facilitate communication over the air interface 28 with a base station. The wireless communication interface 56 may be an antenna, an infrared port, or some other apparatus.

Figure 3:
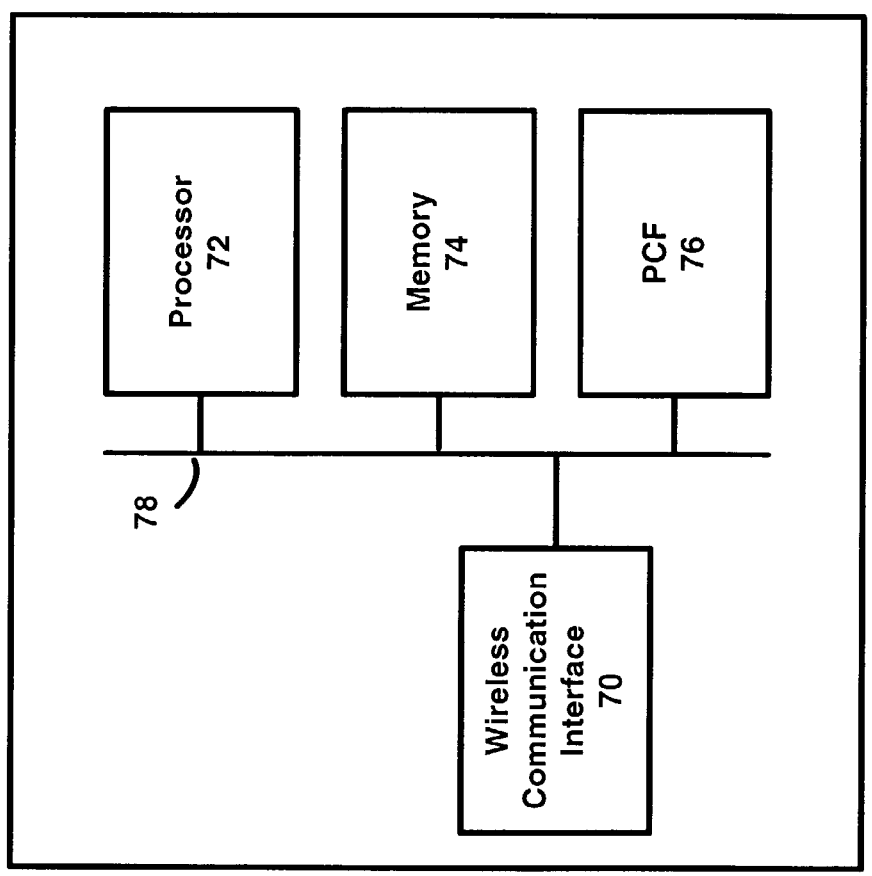
FIG. 3 is a block diagram depicting an exemplary base station.

FIG. 3 is a block diagram depicting an exemplary base station. The base station may have a processor 72, memory 74, and a wireless communication interface 70, coupled to a bus 78. The processor 72 may execute computer instructions stored in the memory 74 for establishing a radio link layer connection to the wireless terminal 12. The radio link layer connection to the wireless terminal 12 may facilitate exchange of voice traffic or data traffic over the air interface 28. Like the wireless communication interface 56, the wireless communication interface 70 may be an antenna, an infrared port, or some other apparatus for facilitating communication over the air interface 28.

Additionally, the base station may have a PCF 76 coupled to the bus 78. The PCF 76 may buffer data traffic sent by the proxy server 20 when a radio link layer connection to the wireless terminal 12 is unavailable to convey the data traffic to the wireless terminal 12. Any data traffic sent by the proxy server 20 may be buffered in the PCF 76 until a radio link layer connection to the wireless terminal 12 is available to convey the data traffic. The base station may then convey to the wireless terminal 12 the data traffic buffered in the PCF 76.

Figure 4:
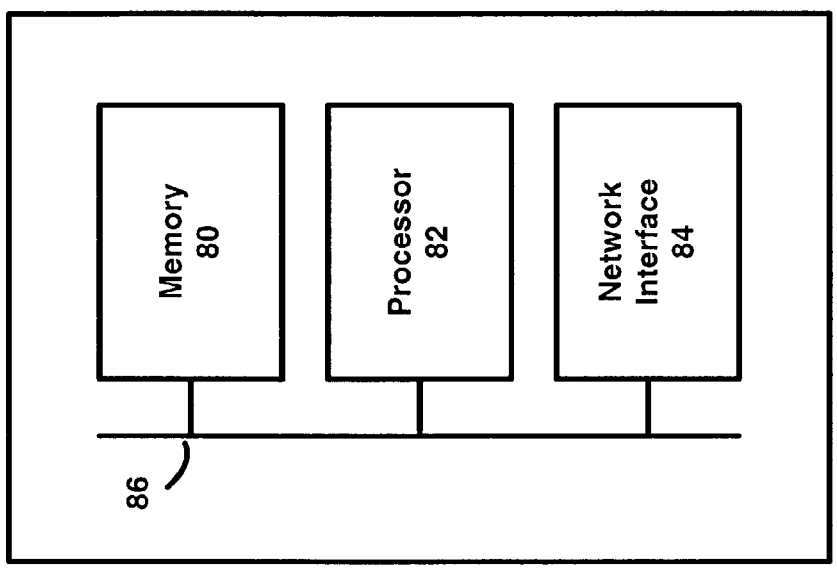
FIG. 4 is a block diagram depicting an exemplary proxy server.

FIG. 4 is a block diagram depicting an exemplary proxy server 20. The proxy server 20 may have a processor 82 and memory 80, coupled to a bus 86. The memory 80 may store computer instructions executable by the processor 82 to define, for instance, a software entity, such as a service agent, that runs on the proxy server 20. The service agent may function to send and receive data traffic defined by the application server 22. Additionally, the proxy server 20 may have a network interface 84 coupled to the bus 86. The network interface 84 may allow the service agent, and thus the proxy server 20 to communicate with the base station. For example, the network interface 84 may allow the proxy server 20 to send and receive data traffic with the application server 22 and the base station. The proxy server 20 may take a variety of other forms, in addition to, or instead of, those described here.

Figure 5:
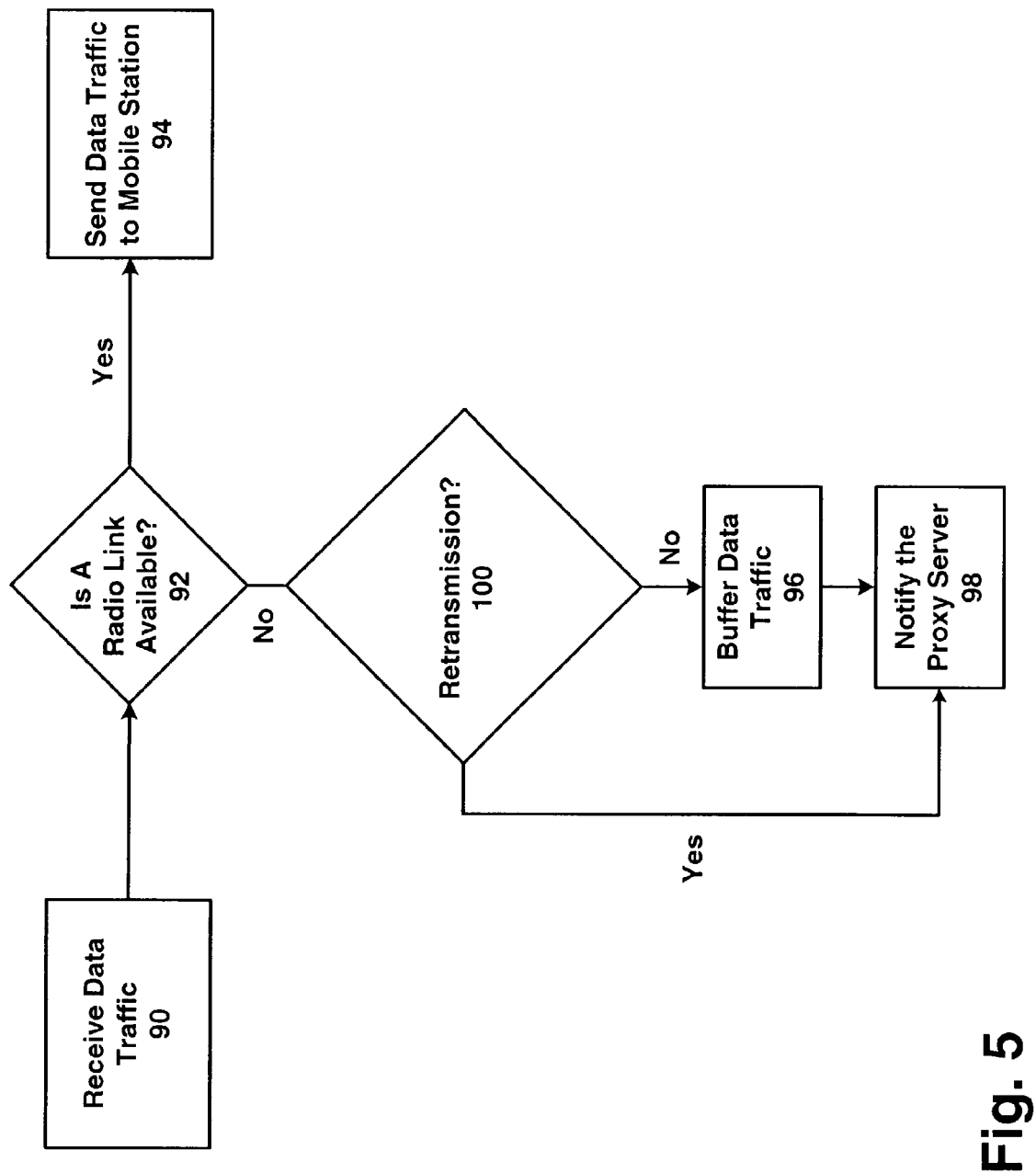
FIG. 5 is a flow chart depicting functions performed by the base station to cause the proxy server to delay retransmission of data traffic to the wireless terminal.

FIG. 5 is a flow chart that illustrates functions performed by the base station, in accordance with an exemplary embodiment of the present invention. By performing the functions of FIG. 5, the base station may cause the proxy server 20 to delay retransmission of data traffic to the wireless terminal 12, when a radio link layer connection to the wireless terminal is unavailable to convey data traffic to the wireless terminal 12. That way, the base station might not have to buffer as much data traffic received from the proxy server 20 when a radio link layer connection to the wireless terminal is unavailable to convey data traffic. Additionally, the wireless terminal 12 is not sent duplicate data traffic that would have been produced as a result of the retransmissions.

At step 90, the base station may receive from the proxy server 20, data traffic. The data traffic may take the form of a SIP message such as a SIP INVITE or SIP BYE. Alternatively, the data traffic may take the form of a SIMPLE (SIP for Instant Messaging and Presence Leveraging Extensions) message such as SIP SUBSCRIBE, SIP NOTIFY, SIP MESSAGE, or SIP PUBLISH. Still alternatively, the data traffic may take the form of a WAP message such as a WAP push. Other arrangements are also possible.

IETF (Internet Engineering Task Force) RFC's (Request for Comments) 3428 and 3261-3266, the contents of which are herein incorporated by reference in its entirety, define the forms of various SIP and SIMPLE messages. Additionally, WAP Architecture Version 12-July 2001 WAP Architecture Specification, the contents of which are herein incorporated by reference in its entirety, define the forms of various WAP messages. The exemplary embodiment of the present invention, however, is not limited by the form or type of the data traffic.

At step 92, the base station may determine whether a radio link layer connection to the wireless terminal is available to convey data traffic. The base station may be able to convey to the wireless terminal 12 data traffic if a radio link layer connection to the wireless terminal is available. On the other hand, the base station might not be able to convey to the wireless terminal 12 data traffic if a radio link layer connection to the wireless terminal is unavailable.

The base station may determine in a variety of ways whether a radio link layer connection to the wireless terminal is available or unavailable to convey data traffic.

According to one exemplary embodiment, the base station may try to assign to the wireless terminal 12 a traffic channel to convey data traffic. The base station may be able to assign to the wireless terminal 12 a traffic channel to convey data traffic if there are no traffic channels assigned to the wireless terminal to convey voice traffic. Alternatively, the base station might not be able to assign to the wireless terminal 12 a traffic channel to convey data traffic if, for example, (i) there is a traffic channel assigned to the wireless terminal to convey voice traffic; (ii) there are no more radio resources, i.e., traffic channels, available to the base station; or (iii) the wireless terminal 12 is in an area with poor radio coverage. If the base station is able to assign to the wireless terminal 12 a traffic channel to convey data traffic, then a radio link layer connection to the wireless terminal 12 is available. On the other hand, if the base station is unable to assign to the wireless terminal 12 a traffic channel to convey data traffic, then a radio link layer connection to the wireless terminal 12 is unavailable.

According to another exemplary embodiment, a service option may be associated with a wireless terminal 12. The service option may be stored in the memory 74 of the base station and provide an indication of a type of communication with the wireless terminal 12. Interim Standard (IS) 2000 published by the Telecommunication Industry Association (TIA) and the contents of which are incorporated by reference in its entirety, defines various service options. For example, "service option 6" may indicate that the type of communication is voice traffic and "service option 33" may indicate that the type of communication is data traffic. The base station may review the service option to determine whether a radio link layer connection to the wireless terminal 12 is available to convey the data traffic sent by the proxy server 20.

For instance, the service option may indicate that the type of communication with the wireless terminal 12 is data traffic. If the type of communication is data traffic, then a radio link layer connection to the wireless terminal may be available to convey the data traffic received from the proxy server 20. On the other hand, the service option may indicate that the type of communication with the wireless terminal 12 is voice traffic. If the type of communication is voice traffic, then a radio link layer connection to the wireless terminal might be unavailable to convey data traffic received from the proxy server 20.

According to yet another exemplary embodiment, the base station may examine contents of the PCF 76 to determine whether a radio link layer connection to the wireless terminal is available to convey data traffic. The data traffic sent by the proxy server 20 may be addressed to a particular wireless terminal. For instance, the data traffic in the PCF 76 may have an IP address of the particular wireless terminal. The base station may compare the amount of data traffic addressed to the particular wireless terminal to a threshold level. If the amount exceeds the threshold level, then the radio link layer connection may be unavailable to convey the data traffic. On the other hand, if the amount does not exceed the threshold level, then a radio link layer connection to the wireless terminal may be available to convey the data traffic.

Other arrangements are also possible for defining the availability or unavailability of the radio link layer connection. For instance, availability of the radio link layer connection may also take into account available bandwidth over the radio link layer connection. The data traffic may be sent to the wireless terminal if the traffic channel has sufficient bandwidth to convey the data traffic. Moreover, the data traffic may be sent with or without regard to whether a radio link layer connection is also carrying voice traffic. Otherwise, the data traffic may be buffered in the PCF 76. The exemplary embodiment of the present invention should not be limited by those factors that indicate the availability or unavailability of the radio link layer connection.

If the base station determines that a radio link layer connection to the wireless terminal 12 is available to convey the data traffic, then at step 94, the base station may responsively send to the wireless terminal 12 the data traffic sent by the proxy server 20. The wireless terminal 12 may receive the data traffic and responsively send an acknowledgement back to the proxy server 20. The acknowledgement may signal the proxy server 20 that the wireless terminal 12 received the data traffic.

On the other hand, if the base station determines that a radio link layer connection is unavailable to convey the data traffic, then the base station may determine whether the data traffic is a retransmission of data traffic already buffered in the PCF 76, at step 100. If the data traffic is not a retransmission, then the base station may buffer the data traffic received from the proxy server 20 in the PCF 76, step 96. If the data traffic is a retransmission, then the base station might not buffer the data traffic in the PCF 76. By not buffering the data traffic, the base station might not send to the wireless terminal 12 retransmissions of the data traffic when the radio link layer connection becomes available.

The base station may determine in a variety of ways whether the data traffic received from the proxy server 20 is a retransmission. The data traffic may be defined by at least one packet. There may be a bit in a header or payload of a packet, for example, which indicates whether the data traffic is a retransmission. If the bit indicates that the data traffic is not a retransmission, then the base station may buffer the data traffic in the PCF 76, at step 96. If the bit indicates that the data traffic is a retransmission, then the base station might not buffer the data traffic in the PCF 76, at step 96.

Alternatively, the base station may compare the data traffic received from the proxy server 20 with the data traffic stored in the PCF 76. For instance, the base station may compare to the contents of the PCF 76, the data traffic received from the proxy server 20. If the data traffic is not stored in the in the PCF 76, then the data traffic is not a retransmission, and the base station may buffer the data traffic in the PCF 76. If the data traffic is stored in the in the PCF 76, then the data traffic is a retransmission, and the base station might not buffer the data traffic in the PCF 76.

Regardless of whether the data traffic is buffered or not, at step 98, the base station may notify the proxy server 20. The notification may cause the proxy server 20 to delay retransmission of data traffic to the wireless terminal 12 for a predetermined period of time. The proxy server 20 may delay retransmission up to 16 seconds, for example, but other arrangements are also possible.

The notification may result in the proxy server 20 being informed that the radio link layer connection is unavailable to convey the data traffic. SIP and SIMPLE, for instance, define a variety of messages that indicate a variety of network conditions. In SIP and SIMPLE protocol, the variety of messages that indicate the variety of network conditions is typically exchanged between SIP and SIMPLE capable devices, e.g., the wireless terminal 12 and the proxy server 20. In accordance with the exemplary embodiments of the present invention, the SIP and SIMPLE messages may be sent by a non-SIP or non-SIMPLE capable device, for example, the base station. The base station may send the SIP or SIMPLE messages to inform the proxy server 20 that the radio link layer connection to the wireless terminal is unavailable. Below are just a few examples of the forms that the notification may take:

- A SIP 100 (trying response) message that indicates to the proxy server 20 that the radio link layer connection is unavailable to convey the data traffic and that the base station will continue to try to send the data traffic
- A SIP 480 (temporarily unavailable) message which indicates to the proxy server 20 that a resource is temporarily unavailable
- A SIP 302 (moved temporarily) message which indicates to the proxy server 20 a temporary change in network topology
- A SIP 301 (moved permanently) message which indicates a permanent change in network topology
- A SIP 404 (not found) message which indicates that a resource is not found
- A SIP 410 (gone) message which indicates to the proxy server 20 that the data traffic cannot be sent to the wireless terminal 12 because a resource is gone
- A SIP 486 (busy) message which indicates that a resource on the wireless communication network is busy
- A SIP 182 (queued) message which indicates that data traffic is queued
- An Internet Control Message Protocol (ICMP) (unreachable) message that indicates to the proxy server 20 that the data cannot reach the destination. The ICMP message is defined in RFC 792, the contents of which are herein incorporated by reference in its entirety.

In the exemplary embodiment described above, the base station notifies the proxy server 20 that the radio link layer connection is unavailable. Instead of or in addition to notifying the proxy server 20, the base station may notify the application server 22. By notifying the application server 22, the application server 22 might not send any messages to the proxy server 20, and, in turn, the proxy server 20 might not retransmit any messages to the base station. Additionally, the base station may notify the application server 22 when the wireless network architecture does not include a proxy server 20 or the proxy server 20 is integrated into the application server 22.

Additionally, in the exemplary embodiment described above, the base station determines whether the data traffic is a retransmission of data traffic already stored in the PCF 76. Then, the base station selectively buffers the data traffic. The base station, however, might not make a determination of whether the data traffic is a retransmission. Instead, the base station might store any data traffic received from the proxy server 20, at step 96, without regard as to whether it is a retransmission. Therefore, the base station might not make the determination of step 100. If a radio link layer connection is unavailable at step 92, then the base station may buffer data traffic at step 96 and notify the proxy server at step 98. Other arrangements are also possible consistent with exemplary embodiments of the present invention.

Delaying Retransmissions on Links Other than the Radio Link Layer Connection

The exemplary embodiments described above are directed to the radio link layer connection to the wireless terminal 12 being unavailable to convey data traffic to the wireless terminal 12. The exemplary embodiments described above are also directed to the base station notifying the proxy server 20 to delay retransmission. There could be, however, a communication link other than the radio link layer connection to the wireless terminal that is unavailable to convey data traffic. Also, there could be a network entity other than the base station that notifies the proxy server 20 to delay retransmission.

For example, a PPP link to the wireless terminal is usually established when the wireless terminal 12 requests a radio link layer connection to the wireless terminal 12. The PPP link conveys data traffic sent by the proxy server 20 from the PDSN 18 to the wireless terminal 12.

When the PDSN 18 receives data traffic from the proxy server 20, the PDSN 18 may extract from the data traffic an IP address. The IP address may identify the wireless terminal 12 to which the data traffic is destined. The PDSN 18 may use the IP address to determine the PPP link over which to send the data traffic so that it reaches the wireless terminal 12. The PDSN 18 may have a table that correlates the IP address of the wireless terminal 12 with the PPP link to the wireless terminal 12. If the table indicates that there is a PPP link to the wireless terminal 12, then the PDSN 18 may send the data traffic to the wireless terminal 12. If the table indicates that there is no PPP link to the wireless terminal 12, then the PDSN 18 may then responsively notify the proxy server 20 that the PPP link is unavailable. The PDSN 18, like the base station, may be a non-SIP or non-SIMPLE capable device. Nonetheless, the notification by the PDSN 18 may be a SIP 404 (not found) message, SIP 410 (gone) message, ICMP (unreachable) message, or some other message which indicates to the proxy server 20 that the PPP session is not available. The notification may cause the proxy server 20 to delay retransmission of data traffic to the wireless terminal 12.

A method may thus comprise (i) transmitting data traffic from a first serving node to a second serving node, (ii) determining, during transmission of the data traffic, that a radio link layer connection from the second serving node to a wireless terminal is unavailable to convey the data traffic to the wireless terminal, and (iii) responsively sending from the second serving node to the first serving node a notification that causes the network entity to delay retransmission of the data traffic to the wireless terminal. Further, the first serving node may be selected from the group consisting of an application server and a proxy server, and the second serving node may be selected from the group consisting of a base station and a packet data serving node.

Further, a system may comprise a first serving node, a second serving node, and a wireless terminal. The first serving node may include logic for transmitting data traffic to the second serving node, and the second serving node may include logic for (i) making a determination, during transmission of the data traffic, that a radio link layer connection from the second serving node to the wireless terminal is unavailable to convey the data traffic to the wireless terminal and (ii) based on the determination, sending from the second serving node to the first serving node a notification that causes the first serving node to delay retransmission of the data traffic. Again here, the first serving node may be selected from the group consisting of a proxy server and an application server, and the second serving node may be selected from the group consisting of a base station and a packet data serving node.

And further, a system may comprise (i) means for transmitting data traffic from a first serving node to a second serving node, (ii) means for determining, during transmission of the data traffic, that a radio link layer connection from the second serving node to a wireless terminal is unavailable to convey the data traffic to the wireless terminal, and (iii) means for responsively sending from the second serving node to the first serving node a notification that causes the network entity to delay retransmission of the data traffic. And again, the first serving node may be selected from the group consisting of a proxy server and an application server, and the second serving node may be selected from the group consisting of a packet data serving node and a base station.

Exemplary embodiments of the present invention have been described above. Those skilled in the art will understand, however, that changes and modifications may be made to these embodiments without departing from the true scope and spirit of the invention, which is defined by the claims.

What is claimed is:

1. A method comprising:
    receiving data traffic transmitted from a server to a base station, the data traffic being destined to a wireless terminal served by the base station;
    upon receiving the data traffic, determining that a radio link layer connection from the base station to the wireless terminal is unavailable to convey the data traffic to the wireless terminal, wherein determining that the radio link layer connection from the base station to the wireless terminal is unavailable to convey the data traffic to the wireless terminal comprises determining that a voice traffic channel is currently assigned to the wireless terminal; and
    responsive to determining that the radio link layer connection from the base station to the wireless terminal is unavailable to convey the data traffic to the wireless terminal, sending from the base station to the server a notification that causes the server to delay retransmission of the data traffic.

2. The method of claim 1, wherein the data traffic is selected from the group consisting of a SIP message, a SIMPLE message, and a WAP message.

3. The method of claim 1, wherein sending the notification comprises sending from a base station to the server a message selected from the group consisting of a SIP 100 (trying) message, a SIP 182 (queued) message, a SIP 410 (gone) message, and an ICMP (unreachable) message.

4. The method of claim 3, further comprising the server receiving the message and responsively delaying retransmission of the data traffic.

5. The method of claim 1, wherein the server is selected from the group consisting of a proxy server and an application server.

6. The method of claim 1, further comprising buffering the data traffic in a packet control function when the radio link layer connection from the base station to the wireless terminal is unavailable.

7. The method of claim 6, wherein buffering the data traffic in the packet control function comprises buffering the data traffic when the data traffic is not a retransmission.

8. A method comprising:
receiving data traffic transmitted from a first serving node to a second serving node, the data traffic being destined to a wireless terminal served by the second serving node;
upon receiving the data traffic, determining that a radio link layer connection from the second serving node to the wireless terminal is unavailable to convey the data traffic to the wireless terminal, wherein determining that the radio link layer connection from the second serving node to the wireless terminal is unavailable to convey the data traffic to the wireless terminal comprises determining that a voice traffic channel is currently assigned to the wireless terminal; and
responsive to determining that the radio link layer connection from the second serving node to the wireless terminal is unavailable to convey the data traffic to the wireless terminal, sending from the second serving node to the first serving node a notification that causes the first serving node to delay retransmission of the data traffic,
wherein the first serving node is selected from the group consisting of an application server and a proxy server, and
wherein the second serving node is selected from the group consisting of a base station and a packet data serving node.

9. A system comprising:
a first serving node selected from the group consisting of a proxy server and an application server;
a second serving node selected from the group consisting of a base station and a packet data serving node; and
a wireless terminal,
wherein the first serving node includes logic for transmitting data traffic to the second serving node, and
wherein the second serving node includes logic executable upon receipt of the data traffic from the first serving node, for:

(i) making a determination that a radio link layer connection from the second serving node to the wireless terminal is unavailable to convey the data traffic to the wireless terminal, wherein making the determination that the radio link layer connection from the second serving node to the wireless terminal is unavailable to convey the data traffic to the wireless terminal comprises making a determination that a voice traffic channel is currently assigned to the wireless terminal; and (ii) based on the determination that the radio link layer connection from the second serving node to the wireless terminal is unavailable to convey the data traffic to the wireless terminal, sending from the second serving node to the first serving node a notification that causes the first serving node to delay retransmission of the data traffic.

10. The system of claim 9, wherein the second serving node comprises a packet control function.

11. The system of claim 9, wherein the notification is selected from the group consisting of a SIP 100 (trying) message, a SIP 182 (queued) message, a SIP 410 (gone) message, and an ICMP (unreachable) message.

12. The system of claim 9, wherein the data traffic is selected from the group consisting of a SIP message, SIMPLE message, and WAP message.

13. The system of claim 9, wherein the second serving node is a base station, and wherein the base station comprises logic to buffer the data traffic in a packet control function.

14. The system of claim 13, wherein the logic to buffer the data traffic in the packet control function comprises logic to buffer the data traffic in the packet control function when the data traffic is not a retransmission.

15. A system comprising:
means for receiving data traffic from a first serving node to a second serving node, the data traffic being destined to a wireless terminal served by the second serving node;
means for determining, upon receipt of the data traffic, that a radio link layer connection from the second serving node to the wireless terminal is unavailable to convey the data traffic to the wireless terminal, wherein the means for determining that the radio link layer connection from the second serving node to the wireless terminal is unavailable to convey the data traffic to the wireless terminal comprises means for determining that a voice traffic channel is currently assigned to the wireless terminal; and
means, responsive to determining that the radio link layer connection from the second serving node to the wireless terminal is unavailable to convey the data traffic to the wireless terminal, for sending from the second serving node to the first serving node a notification that causes the first serving node to delay retransmission of the data traffic,
wherein the first serving node is selected from the group consisting of a proxy server and an application server; and
wherein the second serving node is selected from the group consisting of a packet data serving node and a base station.

* * * * *

UNITED STATES PATENT AND TRADEMARK OFFICE
CERTIFICATE OF CORRECTION

| | | |
|---|---|---|
| PATENT NO. | : 7,689,223 B1 | Page 1 of 1 |
| APPLICATION NO. | : 10/454858 | |
| DATED | : March 30, 2010 | |
| INVENTOR(S) | : Lewis | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,279 days.

Signed and Sealed this
Eighteenth Day of January, 2011

David J. Kappos
*Director of the United States Patent and Trademark Office*